(12) United States Patent
Wang

(10) Patent No.: US 7,418,052 B2
(45) Date of Patent: Aug. 26, 2008

(54) ITERATIVE TURBO DECISION FEEDBACK RECEIVER

(75) Inventor: Jin Wang, Central Islip, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 712 days.

(21) Appl. No.: 10/903,312

(22) Filed: Jul. 30, 2004

(65) Prior Publication Data
US 2005/0243951 A1    Nov. 3, 2005

Related U.S. Application Data

(60) Provisional application No. 60/566,585, filed on Apr. 29, 2004.

(51) Int. Cl.
*H04L 23/02* (2006.01)

(52) U.S. Cl. .......... 375/265; 375/229; 375/341; 714/755; 714/758; 714/792; 714/794; 714/795

(58) Field of Classification Search .......... 375/262, 375/265, 285, 341, 229; 714/755, 758, 774, 714/786, 791, 792, 794, 795
See application file for complete search history.

(56) References Cited

U.S. PATENT DOCUMENTS 6,799,295 B2 * 9/2004 Nguyen .......... 714/794
6,957,376 B2 * 10/2005 Becker et al. .......... 714/755
7,096,402 B2 * 8/2006 Yano et al. .......... 714/755
7,260,762 B2 * 8/2007 Desai et al. .......... 714/755

OTHER PUBLICATIONS

Ojanperä et al., "An Overview of Air Interface Multiple Access for IMT-2000/UMTS," IEEE Communications Magazine, Sep. 1998, pp. 82-95.
Klein et al., "Zero Forcing and Minimum Mean-Square-Error Equalization for Multiuser Detection in Code-Division Multiple-Access Channels," IEEE Transactions on Vehicular Technology, vol. 45, No. 2, May 1996, pp. 276-287.
Wang et al., "Monte Carlo Bayesian Signal Processing for Wireless Communications," Journal of VLSI Signal Processing 30. Kluwer Academic Publishers, The Netherlands, 2002, pp. 89-105.
Holma et al., *WCDMA for UMTS, Radio Access for Third Generation Mobile Communications*, John Wiley & Sons, Ltd., 2001, pp. 27-33.

* cited by examiner

*Primary Examiner*—Dac V Ha
(74) *Attorney, Agent, or Firm*—Volpe and Koenig, P.C.

(57) ABSTRACT

Turbo encoded data is received in a wireless communication system. A signal is received including the turbo encoded data. An initial data estimation is performed on the received signal. At least one iteration of turbo decoding is performed on the estimated data. A subsequent data estimation is performed using the received signal and the result of the turbo decoding. At least one iteration of turbo decoding is performed on a result of the subsequent data estimation.

29 Claims, 3 Drawing Sheets

ITERATIVE TURBO DECISION FEEDBACK RECEIVER

This application claims the benefit of 60/566,585, filed Apr. 29, 2004, which is incorporated by reference as if fully set forth.

FIELD OF INVENTION

The invention generally relates to wireless communication systems. In particular, the invention relates to data estimation and error correction in such systems.

BACKGROUND

FIG. 1 is a simplified block diagram of a typical multi-user transmitter. Data $b_1(i)$ to $b_x(i)$ for each user, user 1 to user x, is turbo encoded by respective turbo encoders $10_1$ to $10_x$. Although each data stream $b_1(i)$ to $b_x(i)$ is described as going to a different user, multiple or all (such as in the uplink) of the streams may be going to the same user. The output of the turbo encoders $d_1(j)$ to $d_x(j)$ are interleaved by respective interleavers (IIs) $12_1$ to $12_x$. The interleaved outputs $e_1(k)$ to $e_x(k)$ are mapped to symbols, such as quadrature phase shift keying (QPSK) or quadrature amplitude modulation (QAM) symbols, by respective symbol mappers $14_1$ to $14_x$. The symbols $f_1(l)$ to $f_x(l)$ are spread by respective speaders $16_1$ to $16_x$. The transmit power level of the spread data is controlled by respective amplifiers $18_1$ to $18_x$, having respective gain values of $A_1$ to $A_x$. The amplified spread data is combined, such as by an adder 20. The combined signal is radiated by an antenna 22 or antenna array through an air interface to the respective users.

FIG. 2 is a simplified block diagram of a typical multi-user receiver. After radiation through the air interface, the combined signal is received by an antenna 24 as a received vector $\bar{r}$. The received vector is processed by a joint detector 26 to produce an estimate of the original interleaved turbo encoded data $\Lambda_1[c_1(1)]$ to $\Lambda_1[cx(1)]$ for each user, as soft values. The interleaved data is deinterleaved by respective deinterleavers ($\Pi^{-1}$ s) $28_1$ to $28_x$. The deinterleaved data is processed by respective turbo decoders $30_1$ to $30_x$, producing respective estimates of the original data $\hat{c}_1(i)$ or $\hat{c}_x(i)$. If only one or multiple ones of the original data streams $b_1(i)$ to $b_x(i)$ were intended for the receiver of FIG. 2, typically, the interleaved data for the other users would not be processed by the receiver.

To meet the demands for higher data rate services, it is desirable to have receivers with higher performance. Illustrations of channels facilitating higher data rate services are the high speed channels of the high speed packet data access (HSDPA) of the Universal Telecommunications System (UMTS) Terrestria Radio Access (UTRA) system and high speed channels of CDMA2000 EVDV. Accordingly, it is desirable to have alternate receiver designs.

BRIEF DESCRIPTION OF THE DRAWING(S)

SUMMARY

Turbo encoded data is received in a wireless communication system. A signal is received including the turbo encoded data. An initial data estimation is performed on the received signal. At least one iteration of turbo decoding is performed on the estimated data. A subsequent data estimation is performed using the received signal and the result of the turbo decoding. At least one iteration of turbo decoding is performed on a result of the subsequent data estimation.

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Figure 1:
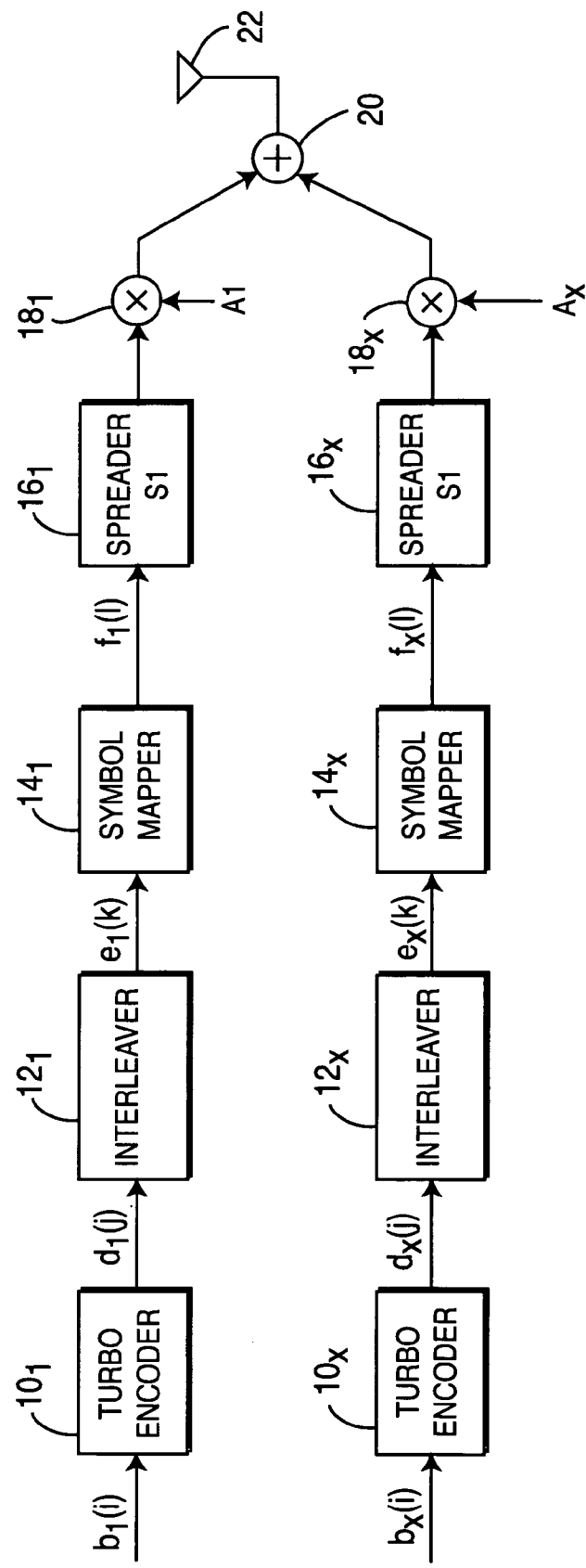
FIG. 1 is a simplified diagram of a multi-user transmitter.
Figure 2:
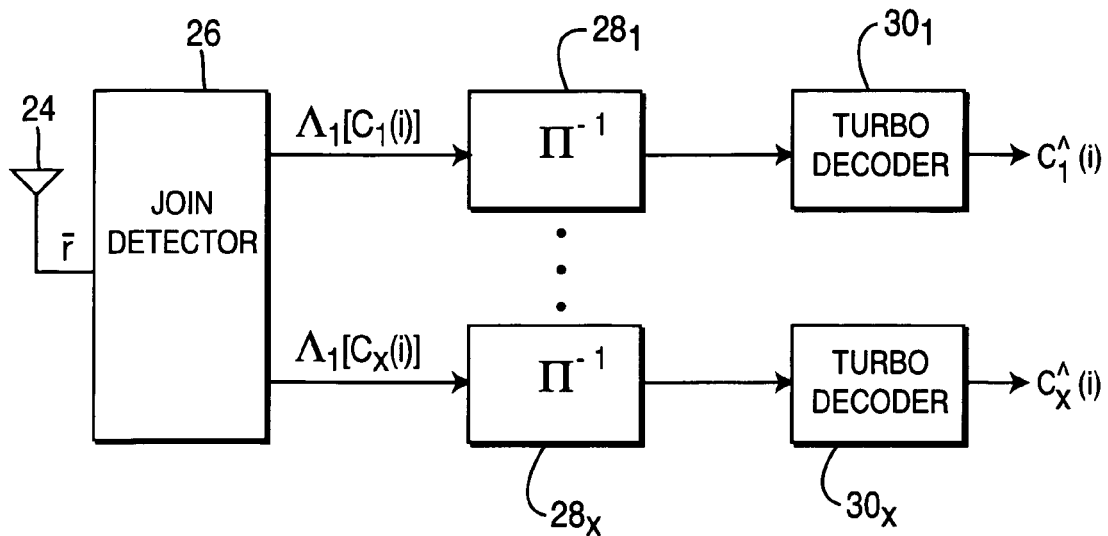
FIG. 2 is a simplified diagram of a multi-user receiver.
Figure 3:
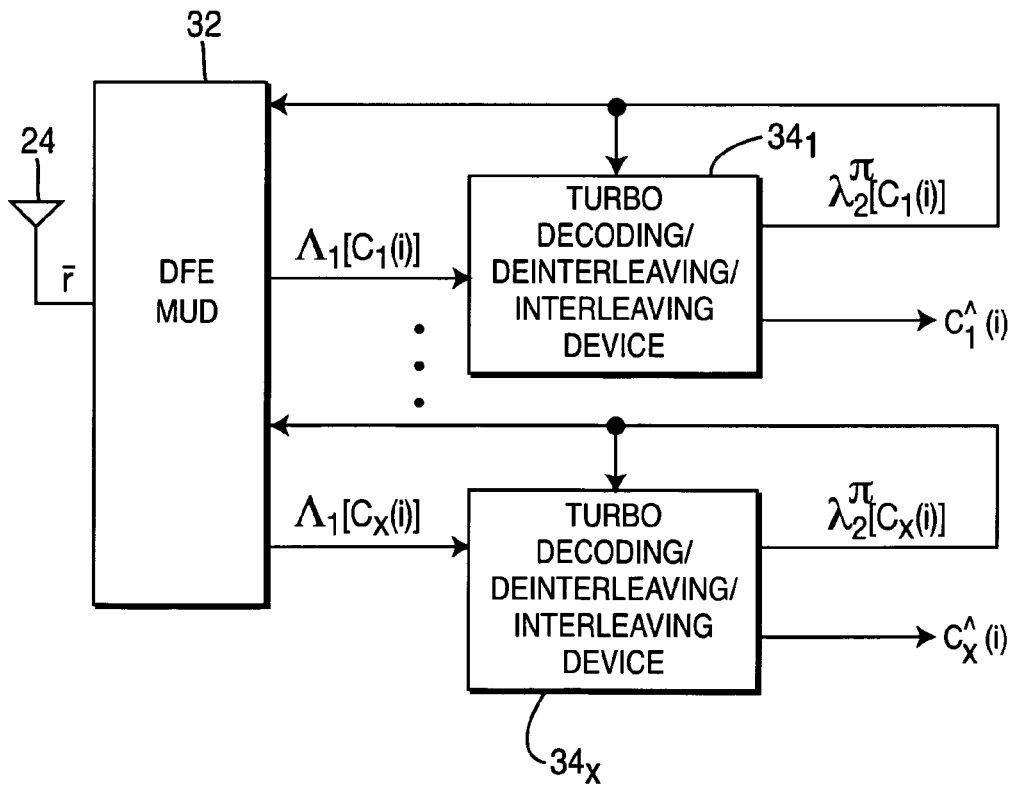
FIG. 3 is an embodiment of an iterative turbo decision feedback receiver.

FIG. 3 is an embodiment of an iterative turbo decision feedback receiver. The iterative turbo decision feedback receiver can be used in a WTRU and/or a base station. It can also be used for WTRU to WTRU communication, such as in ad hoc mode. The iterative turbo decision feedback receiver can be used in any wireless system where multiple user signals share a same frequency spectrum, such as code division multiple access (CDMA) and orthogonal frequency division multiple access (OFDMA). Illustrations of such CDMA type systems are the wideband code division multiple access (W-CDMA) time division duplex mode (both high chip rate and low chip rate, TD-SCDMA, time division synchronous CDMA) and frequency division duplex (FDD) mode and CDMA 2000 EVDO, EVDV, among others.

A combined user signal is received by an antenna 24 or antenna array as a received vector $\bar{r}$. If a reception antenna array (having N antennas) is used, multiple received vectors $\bar{r}_1$ to $\bar{r}_N$ are produced or a combined received vector $\bar{r}$ may be produced. If multiple chip rate sampling, such as M times the chip rate, is used, multiple received vectors may be produced, $\bar{r}_1$ to $\bar{r}_M$ or a combined received vector $\bar{r}$ may be produced. Also, a combination of an antenna array and multiple chip rate sampling may be used, producing received vectors $\bar{r}_{11}$ to $\bar{r}_{NM}$ or a combined received vector $\bar{r}$.

The received vector $\bar{r}$ is processed by a decision feedback (DF) multi-user detector (MUD) 32. The MUD 32 typically is implemented using an algorithm that cancels both multiple access interference (MAI) and inter-symbol interference (ISI), although other implementations may be used. Soft values, $\Lambda_1[c_1(1)]$ to $\Lambda_1[c_x(1)]$, of the interleaved turbo encoded data are produced for each user. The soft values for each user are processed by respective turbo decoding/deinterleaving/interleaving devices $34_1$ to $34_x$. The turbo decoding/deinterleaving/interleaving devices deinterleave the soft values and perform one, or alternately multiple, iteration(s) of turbo decoding producing an initial estimate of the user data $\hat{c}_1(1)$ to $\hat{c}_x(1)$. Using the initial estimate, the interleaved data is reconstructed for each user, $\lambda_2^{\pi}[c_1(1)]$ to $\lambda_2^{\pi}[c_x(1)]$. The reconstructed interleaved data $\lambda_2^{\pi}[c_1(1)]$ to $\lambda_2^{\pi}[c_x(1)]$ is typically soft values although hard values may be used. The reconstructed interleaved data for each user is fed back to the turbo decoding/deinterleaving/interleaving device $34_1$ to $34_x$ for that user. The reconstructed interleaved data for all the users is fed back to the DF MUD 32. The DF MUD 32 produces another estimate of the interleaved turbo encoded data, $\Lambda_1[c_1(2)]$ to $\Lambda_1[c_x(2)]$, for each user. The second iteration of the interleaved turbo encoded data is input in the turbo decoding/deinterleaving/interleaving device $34_1$ to $34_x$ along with the reconstructed interleaved data from the first iteration $\lambda_2{}^\pi[c_1(1)]$ to $\lambda_2{}^\pi[c_x(1)]$, to produce a second iteration of the user data $\hat{c}_1(2)$ to $\hat{c}_x(2)$ and the reconstructed interleaved data $\lambda_2{}^\pi[c_1(2)]$ to $\lambda_2{}^\pi[c_x(2)]$. The feedback loop is repeated for i iterations, where each users estimated data $\hat{c}_1(i)$ to $\hat{c}_x(i)$ is produced by the turbo decoding/deinterleaving/interleaving device $34_1$ to $34_x$. For the final iteration, only the user data for the data streams associated with the receiver may be processed to reduce the computational complexity.

The iterative turbo receiver takes advantage of using prior symbol probabilities in both the DF MUD and turbo decoding from prior iterations. As a result, the receiver performance gain is increased. Such performance gain is particularly desirable for high speed channels such as those proposed for HSDPA and CDMA2000 EVDV. The iterations performed by the iterative turbo receiver may be set at a predetermined number or other criteria. One criteria may take a difference between the estimated data $\hat{c}_1(i)$ to $\hat{c}_x(i)$ between iterations and determine whether the difference is below a specified threshold. Additionally, the turbo decoding iterations may be performed more frequently than the MUD iterations, such a multiple turbo decoding iterations for each MUD iteration. Such an approach may reduce the number of MUD functions performed, reducing the overall complexity of the receiver.

Figure 4:
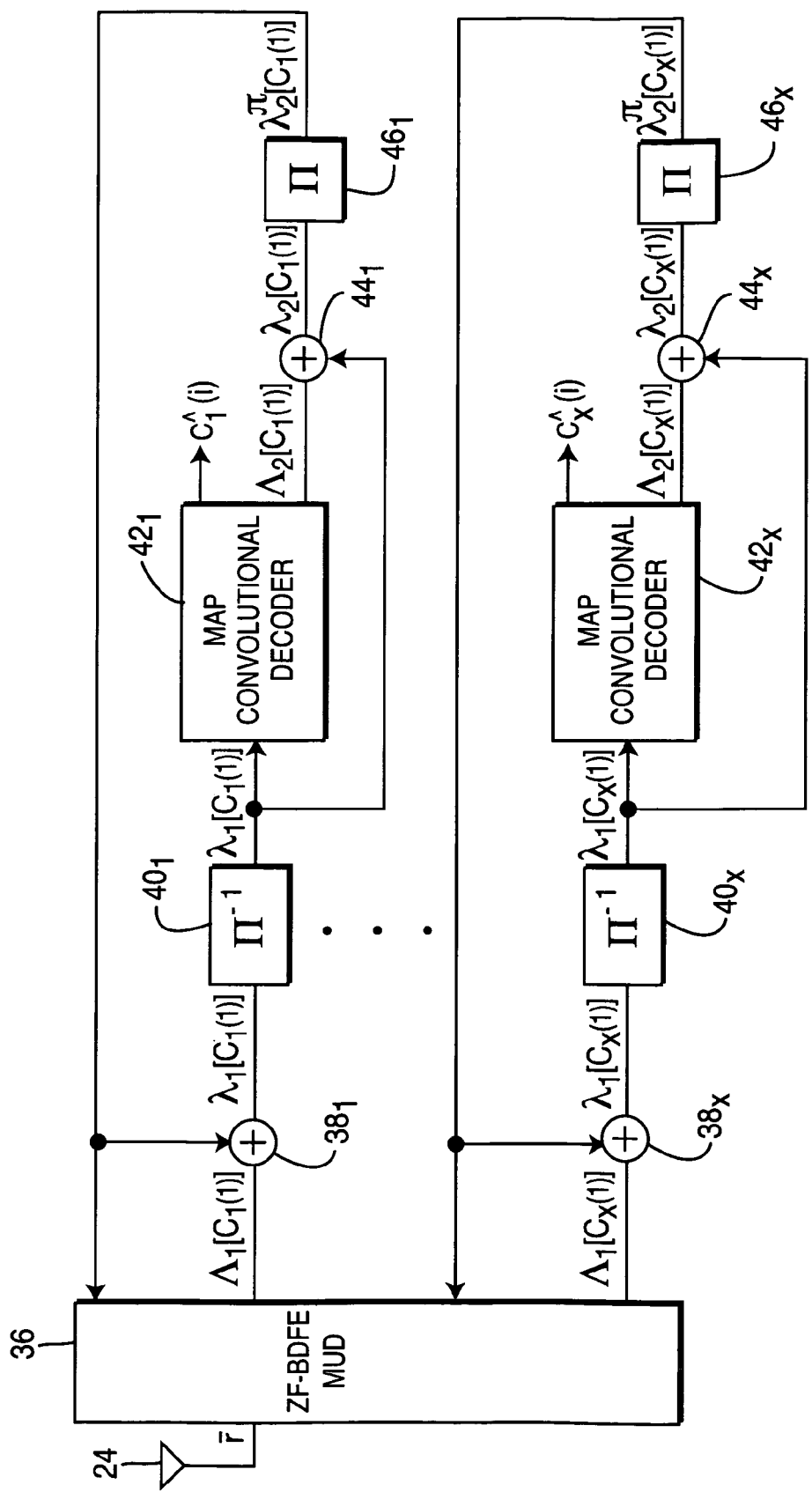
FIG. 4 is an embodiment of an iterative turbo zero forcing block decision feedback equalizer receiver.

FIG. 4 is an embodiment of an iterative turbo zero forcing (ZF) block DF equalization (BDFE) receiver. Although the preferred application of such a receiver is for TDD type systems, it can be applied to other CDMA and OFDMA based systems. A combined user signal is received by an antenna 24 or antenna array as a received vector $\bar{r}$.

The received vector $\bar{r}$ is processed by a ZF-BDFE MUD 36. Soft values, $\Lambda_1[c_1(1)]$ to $\Lambda_1[c_x(1)]$, of the interleaved turbo encoded data are produced for each user. For the initial stage, the soft values $\Lambda_1[c_1(1)]$ to $\Lambda_1[c_x(1)]$ are deinterleaved by a respective deinterleaver $(\Pi^{-1})$ $40_1$ to $40_x$, producing soft values $\lambda_1{}^\pi[c_1(1)]$ to $\lambda_1{}^\pi[c_x(1)]$. The deinterleaved soft values are processed by a respective maximum a posteriori (MAP) convolutional decoder $42_1$ to $42_x$, producing values $\lambda_2[c_1(1)]$ to $\lambda_2[c_x(1)]$. Although these values are preferably soft values, they may also be hard values. The deinterleaved results $\lambda_1{}^\pi[c_1(1)]$ to $\lambda_1{}^\pi[c_x(1)]$ are respectively added to the turbo decoded results $\Lambda_2[c_1(1)]$ to $\Lambda_2[c_x(1)]$, such as by adders $44_1$ to $44_x$ producing $\lambda_1[c_1(1)]$ to $\lambda_1[c_x(1)]$. The output of the adders $44_1$ to $44_x$ are reinterleaved by interleavers (Π) $46_1$ to $46_x$, producing soft values $\lambda_2{}^\pi[c_1(1)]$ to $\lambda_2{}^\pi[c_x(1)]$. The reinterleaved values are provided to the ZF-BDFE MUD 36 for processing in a second iteration. The ZF-BDFE MUD 36 accepts a priori log likelihood ratios (LLRs) for code bits of the known users delivered, such as by a soft input soft output (SISO) MAP turbo decoder. The LLRs for these code bits are updated for the next iteration of the MUD detection. The outputs of the ZF-BDFE MUD 36 for the second iteration $\Lambda_1[c_1(2)]$ to $\Lambda_1[c_x(2)]$ are respectively added by adders $38_1$ to $38_x$ to the reinterleaved results from the first iteration $\lambda_2{}^\pi[c_1(1)]$ to $\lambda_2{}^\pi[c_x(1)]$, producing added results $\Lambda_1[c_1(2)]$ to $\Lambda_1[c_x(2)]$. The added results $\Lambda_1[c_1(2)]$ to $\Lambda_1[c_x(2)]$ are respectively processed by interleavers $40_1$ to $40_x$, MAP turbo decoders $42_1$ to $42_x$, adders $44_1$ to $44_x$ and reinterleavers $46_1$ to $46_x$ for the second iteration. The iterations are repeated, until a final iteration i. For the $i^{th}$ iteration, each users' data $\hat{c}_1(i)$ to $\hat{c}_x(i)$ is finally estimated by respective MAP turbo decoders $42_1$ to $42_x$.

The elements of FIGS. 3 and 4 can be implements on a single or multiple integrated circuits (ICs), discrete components or as a combination of IC(s) and discrete components.

What is claimed is:

1. A method for receiving turbo encoded data comprising:
   (a) receiving a signal including the turbo encoded data;
   (b) performing an initial data estimation of the received signal;
   (c) performing at least one iteration of turbo decoding on the estimated data; and
   (d) performing a subsequent data estimation using the received signal and the result of the turbo decoding; and
   (e) performing at least one iteration of turbo decoding on a result of the subsequent data estimation.

2. The method of claim 1 further comprising repeating steps (d) and (e) for at least one more iteration.

3. The method of claim 2 wherein the repeating of steps (d) and (e) are repeated for a specified number of iterations.

4. The method of claim 2 wherein the repeating of steps (d) and (e) are repeated until a difference between results of the repeating is less than a predetermined threshold.

5. The method of claim 1 wherein the turbo encoded data is also interleaved and between the steps (b) and (c) performing a deinterleaving procedure and between steps (c) and (d) performing an interleaving procedure.

6. The method of claim 1 wherein the at least one turbo decoding iterations is a plurality of turbo decoding iterations.

7. A receiver for processing wirelessly transmitted turbo encoded data, comprising:
   an antenna configured to receive a signal including the turbo encoded data;
   a turbo interleaving device configured to perform an initial data estimation of the received signal;
   a turbo decoder configured to perform at least one iteration of turbo decoding on the estimated data; and
   a decision feedback (DF) multi-user detector (MUD) configured to perform a subsequent data estimation using the received signal and the result of the turbo decoding; and
   wherein the turbo decoder is further configured to perform at least one iteration of turbo decoding on a result of the subsequent data estimation.

8. The receiver of claim 7 wherein the DF MUD is further configured to perform a subsequent data estimation and the turbo decoder is further configured to perform at least one iteration of turbo decoding on a result of the subsequent data estimation for at least one additional iteration.

9. The receiver of claim 8 wherein a total number of iterations of the data estimation is performed for a specified number of iterations.

10. The receiver of claim 8 wherein a total number of iterations of the data estimation is performed until a difference between results of the iterations is less than a predetermined threshold.

11. The receiver of claim 7, further comprising a turbo deinterleaving device, and wherein the turbo encoded data is also interleaved and the turbo deinterleaving device is operatively coupled between the turbo interleaving device and the turbo decoder and the turbo interleaving device is operatively coupled between the turbo decoder and the DF MUD.

12. The receiver of claim 7 wherein the at least one turbo decoding iterations is a plurality of turbo decoding iterations.

13. A wireless transmit/receive unit (WTRU) configured to process wirelessly transmitted turbo encoded data, comprising:
- an antenna configured to receive a signal including the turbo encoded data;
- a turbo interleaving device configured to perform an initial data estimation of the received signal;
- a turbo decoder configured to perform at least one iteration of turbo decoding on the estimated data; and
- a decision feedback (DF) multi-user detector (MUD) configured to perform a subsequent data estimation using the received signal and the result of the turbo decoding; and
- wherein the turbo decoder is further configured to perform at least one iteration of turbo decoding on a result of the subsequent data estimation.

14. The WTRU of claim 13 wherein the DF MUD is further configured to perform a subsequent data estimation and the turbo decoder is further configured to perform at least one iteration of turbo decoding on a result of the subsequent data estimation for at least one additional iteration.

15. The WTRU of claim 14 wherein a total number of iterations of the data estimation is performed for a specified number of iterations.

16. The WTRU of claim 14 wherein a total number of iterations of the data estimation is performed until a difference between results of the iterations is less than a predetermined threshold.

17. The WTRU of claim 13, further comprising a turbo deinterleaving device, and wherein the turbo encoded data is also interleaved and the turbo deinterleaving device is operatively coupled between the turbo interleaving device and the turbo decoder and the turbo interleaving device is operatively coupled between the turbo decoder and the DF MUD.

18. The WTRU of claim 13 wherein the at least one turbo decoding iterations is a plurality of turbo decoding iterations.

19. A base station configured to process wirelessly transmitted turbo encoded data, comprising:
- an antenna configured to receive a signal including the turbo encoded data;
- a turbo interleaving device configured to perform an initial data estimation of the received signal;
- a turbo decoder configured to perform at least one iteration of turbo decoding on the estimated data; and
- a decision feedback (DF) multi-user detector (MUD) configured to perform a subsequent data estimation using the received signal and the result of the turbo decoding; and
- wherein the turbo decoder is further configured to perform at least one iteration of turbo decoding on a result of the subsequent data estimation.

20. The base station of claim 19 wherein the DF MUD is further configured to perform a subsequent data estimation and the turbo decoder is further configured to perform at least one iteration of turbo decoding on a result of the subsequent data estimation for at least one additional iteration.

21. The base station of claim 20 wherein a total number of iterations of the data estimation is performed for a specified number of iterations.

22. The base station of claim 20 wherein a total number of iterations of the data estimation is performed until a difference between results of the iterations is less than a predetermined threshold.

23. The base station of claim 20, further comprising a turbo deinterleaving device, and wherein the turbo encoded data is also interleaved and the turbo deinterleaving device is operatively coupled between the turbo interleaving device and the turbo decoder and the turbo interleaving device is operatively coupled between the turbo decoder and the DF MUD.

24. The base station of claim 20 wherein the at least one turbo decoding iterations is a plurality of turbo decoding iterations.

25. An integrated circuit (IC) for use in a wireless receiver, the IC comprising:
- an input configured to receive a received vector;
- a zero forcing block decision feedback equalization multi-user detector (ZF-BDFE MUD) for estimating data of the received vector and receiving an output of an interleaver;
- a first adder for adding the estimated data to the output of the interleaver;
- a deinterleaver for deinterleaving an output of the first adder;
- a turbo decoder for decoding the output of the deinterleaver;
- a second adder for adding an output of the turbo decoder to the output of the deinterleaver; and
- the interleaver for interleaving an output of the second adder.

26. The IC of claim 25 wherein the turbo decoder is a maximum a posteriori (MAP) turbo decoder.

27. The IC of claim 26 wherein the MAP turbo decoder is a soft input soft output MAP turbo decoder.

28. The IC of claim 25 wherein the ZF-BDFE MUD obtains a priori log likelihood ratios from the output of the interleaver.

29. The IC of claim 25 for processing a plurality of user signals.

* * * * *

UNITED STATES PATENT AND TRADEMARK OFFICE
CERTIFICATE OF CORRECTION

PATENT NO. : 7,418,052 B2
APPLICATION NO. : 10/903312
DATED : August 26, 2008
INVENTOR(S) : Jin Wang It is certified that error appears in the above-identified patent and that said Letters Patent is hereby corrected as shown below:

At column 1, line 41, before the words "for each", delete "$\Lambda_1[cx(1)]$" and insert therefor --$\Lambda_1[c_x(1)]$--.

At column 1, line 55, before the word "Radio", delete "Terrestria", and insert therefor --Terrestrial--.

At column 3, line 14, before the word "estimated", delete "users" and insert therefor --user's--.

At column 3, line 30, after the word "such", delete "a" and insert therefor --as--.

At column 3, lines 47 & 48, after the words "producing values", delete "$\lambda_2[c_1(1)]$ to $\lambda_2[c_x(1)]$" and insert therefor --$\Lambda_2[c_1(1)]$ to $\Lambda_2[c_x(1)]$--.

At column 3, line 52, after the word "producing", delete "$\lambda_1[c_1(1)]$ to $\lambda_1[c_x(1)]$" and insert therefor --$\lambda_2[c_1(1)]$ to $\lambda_2[c_x(1)]$--.

At column 4, line 5, after the words "can be", delete "implements", and insert therefor --implemented--.

UNITED STATES PATENT AND TRADEMARK OFFICE
CERTIFICATE OF CORRECTION

PATENT NO. : 7,418,052 B2
APPLICATION NO. : 10/903312
DATED : August 26, 2008
INVENTOR(S) : Jin Wang It is certified that error appears in the above-identified patent and that said Letters Patent is hereby corrected as shown below:

IN THE CLAIMS

At claim 1, column 4, line 14, after the word "data;", delete "and".

At claim 13, column 5, line 9, after the word "data;", delete "and".

At claim 19, column 5, line 44, after the word "data;", delete "and".

Signed and Sealed this

Ninth Day of December, 2008

JON W. DUDAS
*Director of the United States Patent and Trademark Office*